(12) United States Patent
Woolmer et al.

(10) Patent No.: US 10,608,512 B2
(45) Date of Patent: Mar. 31, 2020

(54) AXIAL FLUX MACHINE MANUFACTURE

(71) Applicant: Yasa Limited, Yarnton, Oxfordshire (GB)

(72) Inventors: Timothy Woolmer, Wheatley (GB); Mark Stephen Ewart East, Hungerford (GB); Jonathan James Biddulph, Wallingford (GB); Andrew Lee Court, Bicester (GB); Christopher Thomas McCaw, Abingdon (GB); Sophie Ann Parker, Didcot (GB)

(73) Assignee: YASA LIMITED, Yarnton (GB)

( * ) Notice: Subject to any disclaimer, the term of this patent is extended or adjusted under 35 U.S.C. 154(b) by 5 days.

(21) Appl. No.: 15/543,799

(22) PCT Filed: Jan. 14, 2016

(86) PCT No.: PCT/GB2016/050084
§ 371 (c)(1),
(2) Date: Jul. 14, 2017

(87) PCT Pub. No.: WO2016/113566
PCT Pub. Date: Jul. 21, 2016

(65) Prior Publication Data
US 2018/0026500 A1   Jan. 25, 2018

(30) Foreign Application Priority Data
Jan. 16, 2015 (GB) .................... 1500738.8

(51) Int. Cl.
*H02K 15/02* (2006.01)
*H02K 21/24* (2006.01)
(Continued)

(52) U.S. Cl.
CPC .......... *H02K 15/022* (2013.01); *H02K 1/146* (2013.01); *H02K 5/02* (2013.01); *H02K 15/16* (2013.01);
(Continued)

(58) Field of Classification Search
CPC ...... H02K 15/022; H02K 15/16; H02K 15/14; H02K 1/146; H02K 5/02; H02K 5/10; H02K 21/24
See application file for complete search history.

(56) References Cited

U.S. PATENT DOCUMENTS

2008/0261065 A1   10/2008   Fujimoto et al.

FOREIGN PATENT DOCUMENTS

| GB | 2059177 A | 4/1981 |
|---|---|---|
| GB | 2468018 A | 8/2010 |

(Continued)

OTHER PUBLICATIONS

Josh Brown, *Quality Control: Laser Plastic Welding—Impossibly Consistent*, LPKF Laser & Electronics (2011), 5 pages.
(Continued)

*Primary Examiner* — Livius R. Cazan
(74) *Attorney, Agent, or Firm* — Meunier Carlin & Curfman LLC

(57) ABSTRACT

We describe a method of manufacturing a stator of an axial flux permanent magnet machine, the machine having a stator comprising a stator housing defining a chamber comprising a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap therebetween in which magnetic flux in the machine is generally in an axial direction, the method comprising: providing first and
(Continued)

second radial walls for said stator housing; providing inner and outer side walls for said stator housing; assembling said first and second radial walls and said inner and outer side walls around said set of coils to form a stator assembly, wherein said assembling further comprises: providing one or more collapsible elements between said side walls and one or both of said first and second radial walls; and attaching said side walls to said first and second radial walls, wherein said attaching comprises controlling one or both of a spacing and a degree of parallelism of said first and second radial walls by controlling the collapse of said one or more collapsible elements.

21 Claims, 7 Drawing Sheets

(51) Int. Cl.
*H02K 15/16* (2006.01)
*H02K 1/14* (2006.01)
*H02K 5/02* (2006.01)
*H02K 5/10* (2006.01)

(52) U.S. Cl.
CPC ............... *H02K 21/24* (2013.01); *H02K 5/10* (2013.01); *H02K 2201/03* (2013.01)

(56) References Cited

FOREIGN PATENT DOCUMENTS

JP 2002337236 11/2002
JP 2009033911 A 2/2009

OTHER PUBLICATIONS

International Search Report dated Apr. 22, 2016, from International Application No. PCT/GB2016/050084, 3 pages.
Written Opinion dated Apr. 22, 2016, from International Application No. PCT/GB2016/050084, 10 pages.
Examination Report under Section 18(3) dated Apr. 3, 2017, from United Kingdom Application No. GB1500738.8, 3 pages.

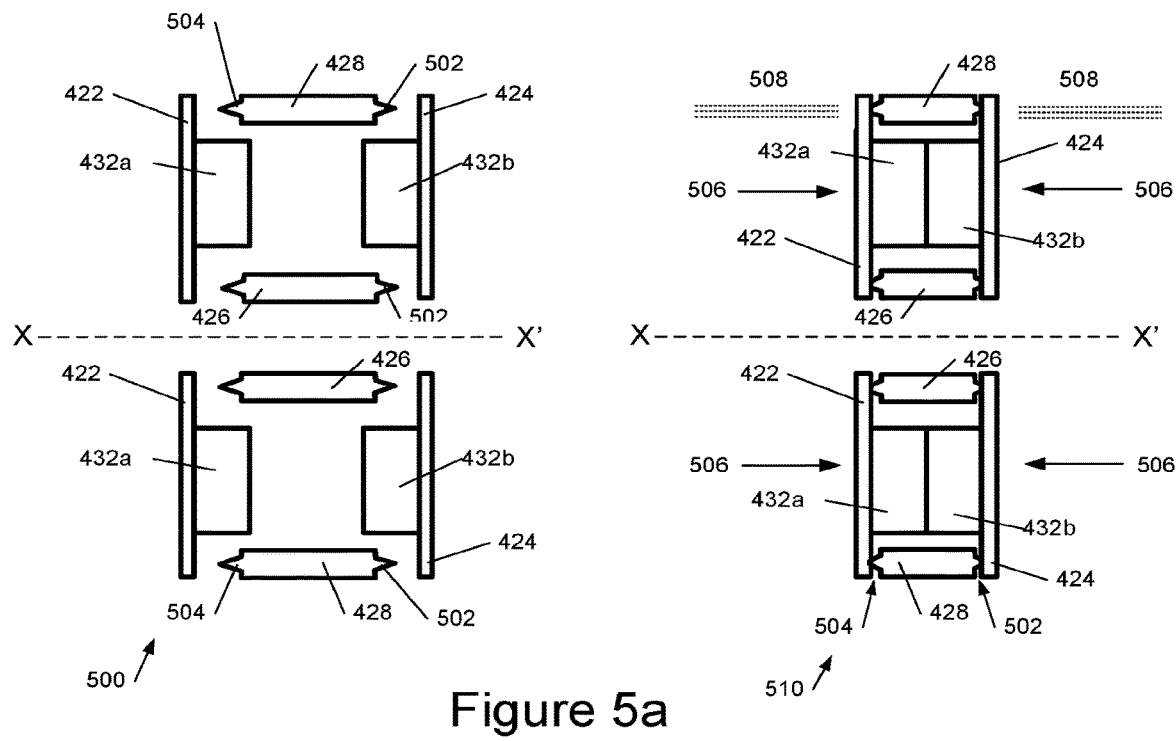
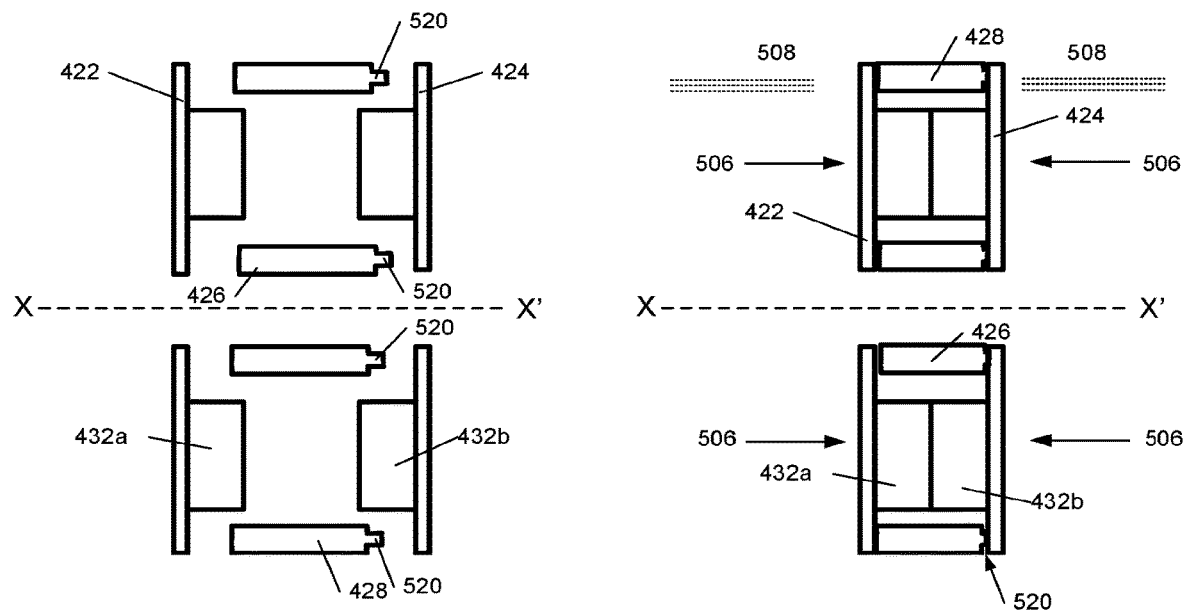
Figure 5a
Figure 5b

AXIAL FLUX MACHINE MANUFACTURE

FIELD OF THE INVENTION

This invention relates to methods of manufacturing a housing for the stator of an axial flux permanent magnet machine, and to housings manufactured by the methods, and to machines incorporating the housings.

BACKGROUND TO THE INVENTION

In this specification we are concerned particularly with methods of manufacturing axial flux permanent magnet machines. One known manufacturing technique for joining plastic is laser plastic welding. This has previously been used in the manufacture of low-tech mass produced parts—for example US2008/0261065 describes use of the technique in manufacturing an airtight housing for a pressure sensor. In some implementations of the technique, for example as illustrated in the abstract of JP2002/337236, one item to be welded transmits the (IR) laser light and the other absorbs the laser light, so that the laser reaches the joint. The joint, prior to welding, may comprise a rib formed on one or other item. It is known to measure the quality of the weld by measuring the collapse of such a rib, as described in LPKF Laser & Electronics 2011, "Quality Control" (downloaded from: http://www.laserplasticwelding.com/quality_control_impossibly_consistent.pdf)

An axial flux permanent magnet machine may function as either a motor or a generator, or both (at different times). Broadly speaking these have disc- or ring-shaped rotor and stator structures arranged about an axis. Typically the stator comprises a set of coils each parallel to the axis and the rotor bears a set of permanent magnets and is mounted on a bearing so that it can rotate about the axis driven by fields from the stator coils. FIG. 1a shows the general configuration of an axial flux machine with a pair of rotors R1, R2 to either side of a stator S—although a simple structure could omit one of the rotors. As can be seen there is an air gap G between a rotor and a stator and in an axial flux machine the direction of flux through the air gap is substantially axial.

There are various configurations of axial flux permanent magnet machine depending upon the arrangement of north and south poles on the rotors. FIG. 1b illustrates the basic configurations of a Torus NS machine, a Torus NN machine (which has a thicker yoke because the NN pole arrangement requires flux to flow through the thickness of the yoke), and a YASA (Yokeless and Segmented Armature) topology. The illustration of the YASA topology shows cross-sections through two coils, the cross-hatched area showing the windings around each coil. As can be appreciated, dispensing with the stator yoke provides a substantial saving in weight and iron losses, but drawbacks of removing the stator yoke are a) loss of the structural strength to the stator (which the iron provided) even though there is potentially increased need for strength because of the YASA topology which, being a compact design, can result in very large stresses and b) loss of a route for heat to escape from stator coils. To address both issues, i.e. the high torque density of the YASA design and generation of significant quantities of heat, a housing for the stator should provide great strength and rigidity to address torque demands and should also define a chamber which can be supplied with coolant for the machine. It can further be appreciated from FIG. 1b that for efficient operation (minimum losses in the high reluctance air gap) the gap between the rotor and stator should be as small as possible.

If the gap between the rotor and stator is very small, very tight tolerances are imposed on the dimensions of the stator housing, in particular the spacing and degree of parallelism in between radial end walls of the stator housing. The tolerance requirements are higher where there are two rotors, one to either side of the stator, and tolerance and alignment problems are particularly acute in some of the two-rotor designs we describe later.

It is generally desirable to improve the performance of axial flux permanent magnet machines. It is particularly desirable reliably to be able to manufacture axial flux permanent magnet machines with a very small rotor-to-stator gap.

SUMMARY OF THE INVENTION

According to a first aspect of the invention there is therefore provided a method of manufacturing a stator of an axial flux permanent magnet machine, the machine having a stator comprising a stator housing defining a chamber comprising a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap therebetween in which magnetic flux in the machine is generally in an axial direction, the method comprising: providing first and second radial walls for said stator housing; providing inner and outer side walls, preferably generally cylindrical walls, for said stator housing; assembling said first and second radial walls and said inner and outer side walls around said set of coils to form a stator assembly, wherein said assembling further comprises: providing one or more collapsible elements between said side walls and one or both of said first and second radial walls; and attaching said side walls to said first and second radial walls, wherein said attaching comprises controlling one or both of a spacing and a degree of parallelism of said first and second radial walls by controlling the collapse of said one or more collapsible elements.

Broadly speaking, embodiments of the method control the collapse of a collapsible element between one or each radial (end) wall and the (generally cylindrical) side walls, in order to be able very accurately to control the spacing and parallelism of the radial, end walls.

In some embodiments a controllable axial collapse of the one or more collapsible elements is achieved by using one or more stops. Thus the end walls of the housing may be put under axial pressure during the assembly, which in embodiments employs (laser) welding. In particular the stops may be internal stops, for example the natural stops formed by pole pieces mounted on respective end walls of the stator (which pole pieces may, but need not necessarily, include pole piece shoes, as described later).

In embodiments the controlled collapse to achieve a target end wall spacing may be achieved by holding the stator assembly in a jig. The jig, or parts thereof, may define the spacing and/or parallelism of the radial walls; the use of one or more collapsible elements provides a small degree of adjustment in the assembly so that this spacing/parallelism may be defined very accurately and repeatedly. This in turn facilitates reducing the rotor-stator gap in the machine, thus increasing the machine's efficiency. Where a jig is employed again one or more stops may be employed—for example the jig may be constructed in such a way that when one part of the jig is closed or moved against a stop on another part of a jig the target spacing/parallelism is automatically achieved. Alternatively the spacing and/or parallelism of the radial walls may be measured by any convenient means, for example a laser or transducer, and adjusted to within a desired tolerance. In general, a jig may be used to impose a controlled distance between the end walls of the stator housing, for example using a servo motor in combination with a ball screw actuator.

In some preferred embodiments of the technique the controlling of the spacing and/or parallelism of the radial (end) walls of the stator housing comprises first controlling an applied force, applied inwards across the end walls, and then controlling a distance between the end walls. Thus in one approach a force greater than a threshold force is applied to collapse the one or more collapsible elements, for example ribs, and then controlling a spacing between the end walls by controlling the distance, preferably so that the one or more collapsible elements are not fully collapsed, to provide some tolerance, for example ~50 μm. Preferably one or more collapsible elements are provide between each end wall and the inner and outer cylindrical housing walls The initial force may be applied until (full) contact is reached for the parts to be welded and then distance control may be employed, preferably in combination with force monitoring. Such an approach may be applied to weld each stator housing end wall in turn.

In another, related approach, the force may be applied to substantially completely collapse a first set of one or more collapsible elements when welding a first of the end walls (though in embodiments complete collapse may not be achieved due to lack of flatness of an end wall, as discussed later). Then the second end wall may be welded onto the assembly, and the spacing/parallelism controlled by controlling a degree of collapse of a second set of one or more collapsible elements between the second end wall and cylindrical walls.

In some preferred embodiments of the techniques described herein an end wall is welded simultaneously to the inner and outer side walls. This facilitates the fabrication of a housing with good parallelism of the end walls, and can be achieved, for example, by high-speed laser welding.

In some embodiments the radial and/or cylindrical walls may be made of metal, preferably aluminium for lightness. In this case the one or more collapsible elements may comprise adhesive for bonding the metal. More preferably, however, the radial and cylindrical walls comprise a polymer, more particularly a thermoplastic polymer especially a high temperature thermoplastic polymer or resin. In this context a high temperature thermoplastic polymer means a polymer with a continuous service temperature (CST) which is specified to be greater than 150° C. Such materials are very stiff, weldable, and, surprisingly, compatible with injection moulding (which is also helpful for reasons described later). Examples of suitable polymer materials include PPS (Polyphenylene sulphide), PPA (Polyphthalamide), PEEK (Polyether ether ketone) ABS (Acrylonitrile Butadiene Styrene), and PA (Polyamide). Polyphthalamide is a particularly preferred material; one example is Zytel® from DuPont™

Where the radial and/or cylindrical walls comprise polymer, the one or more collapsible elements may comprise one or more ribs or other formations on either or both of the cylindrical and radial walls. In one preferred embodiment the cylindrical and radial walls are joined by laser welding. In this case the radial walls may be (IR) laser-transmissive and the cylindrical walls (IR) laser absorbent. In preferred embodiments the resulting stator housing defines a closed chamber or cavity within which coolant such as oil may be circulated. Optionally a coolant inlet and/or outlet is provided to facilitate external circulation of coolant.

In one preferred approach a radial wall for the stator housing is fabricated by placing a membrane of fibre-reinforced resin into the mould of an injection moulding machine, and injection moulding a set of reinforcing features on to the membrane using a thermoplastic polymer. The thermoplastic polymer bondable, when molten, with the fibre-reinforced resin. In embodiments of the methods the stator bars may be bonded to the membrane prior to forming the reinforcing features where present (reinforcing features are preferable but not essential), in particular by heating the stator bars and pressing the bars in to the membrane. This facilitates accurate control of the thickness of the membrane between the ends (shoes) of the stator bars and the air gap, thus further facilitating overall control of the air gap. In embodiments the membrane thickness may be less than 1 mm or less than 0.5 mm, and the air gap may be less than 3 millimetres, 2 millimetres, or 1 millimetres. The reinforcing features on the membrane may comprise a plurality of ribs, for example in the form of a "spider"; preferably the height of these above the membrane is 3 millimetres or greater.

Preferred embodiments of the machine comprise two rotors, one to either side of the stator. The techniques we have described facilitate the manufacture of a particular type of two-rotor axial flux machine, one in which one rotor is mounted on the other—this imposes a requirement for particularly high tolerances within the machine. In embodiments of the axial flux machines we describe a rotor may be provided with a labyrinth seal with the stator. More particularly, in one embodiment described later, the seal is made between the rotor and a flange on the stator. This labyrinth seal may comprise one or more groves, on one of the rotor/stator, engaged (without touching) by one or more corresponding projections, on the other of the rotor/stator. The use of such a seal imposes very tight tolerance constraints but embodiments of the techniques we describe enable the use of such a seal. This is particularly helpful where the machine is to be used outdoors where water, in particular rain, may be present.

We have described manufacturing techniques in which radial (end) walls are attached to generally cylindrical side walls. For example a pair of radial walls may be attached, one at each end, to the (cylindrical) side walls to define an annular space therebetween. Alternatively one radial wall may be attached to the inner and outer side walls and then the second radial wall attached to the assembly using one or more collapsible elements as previously described.

In a still further approach the stator housing may be provided by a pair of clamshells, each comprising a radial wall and at least part of a cylindrical wall. For example each clamshell may comprise a radial wall and around half the length of a cylindrical wall. Alternatively one clamshell may comprise a radial wall and one of the inner cylindrical walls, say the inner wall, and the other clamshell may comprise a second radial wall and the other cylindrical wall, for example the outer wall. The skilled person will recognise that variations on these approaches are possible.

Thus in a related aspect the invention provides a method of manufacturing a stator of an axial flux permanent magnet machine, the machine having a stator comprising a stator housing defining a chamber comprising a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap therebetween in which magnetic flux in the machine is generally in an axial direction, the method comprising: providing first and second stator housing clamshells, each comprising a radial wall for the stator housing and at least a portion of a side wall for the stator housing; assembling said first and second stator housing clamshells around said set of coils to form a stator assembly, wherein the first and second stator housing clamshells together define an annular chamber enclosing said set of coils, and wherein said assembling further comprises: providing one or more collapsible elements between said first and second stator housing clamshells; and attaching said first and second stator housing clamshells, wherein said attaching comprises: controlling one or both of a spacing and a degree of parallelism of said first and second radial walls by controlling the collapse of said one or more collapsible elements.

The skilled person will recognise that the preferred features of the previously described aspect of the invention may equally be applied to this clamshell-based approach to manufacturing a stator housing.

More generally the invention provides a method of manufacturing a stator of an axial flux permanent magnet machine, the machine having a stator comprising a stator housing defining a chamber comprising a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap therebetween in which magnetic flux in the machine is generally in an axial direction, the method comprising controlling the axial compression of one or more collapsible elements of said stator housing during fabrication, in particular laser welding, of the housing to control a spacing between end walls of said housing.

The skilled person will appreciate that embodiments of this aspect of the invention may incorporate any of the preferred features described above with reference to the first aspect of the invention.

The invention also provides an axial flux permanent magnet machine, the machine having a stator with a stator housing defining a chamber comprising a set of coils wound on respective stator bars and disposed circumferentially at intervals about an axis of the machine, and at least one rotor bearing a set of permanent magnets and mounted for rotation about said axis, and wherein said rotor and stator are spaced apart along said axis to define a gap therebetween in which magnetic flux in the machine is generally in an axial direction; wherein said stator housing further comprises one or more collapsed elements; and wherein said one or more collapsed elements comprise a collapsed polymer formation.

In embodiments of the methods and apparatus we describe the machine may be a motor or a generator. Preferred embodiments of the techniques we describe are used in a yokeless and segmented armature machine because they facilitate accurate fabrication of the stator. This is particularly important in the absence of a yoke, especially when the machine is under load.

BRIEF DESCRIPTION OF THE DRAWINGS

These and other aspects of the invention will now be further described, by way of example only, with reference to the accompanying figures in which:

FIGS. 5a to 5d show, schematically, methods of manufacturing the stator housing of an axial flux permanent magnet machine according to embodiments of the invention;

DETAILED DESCRIPTION OF PREFERRED EMBODIMENTS

Figure 1A:
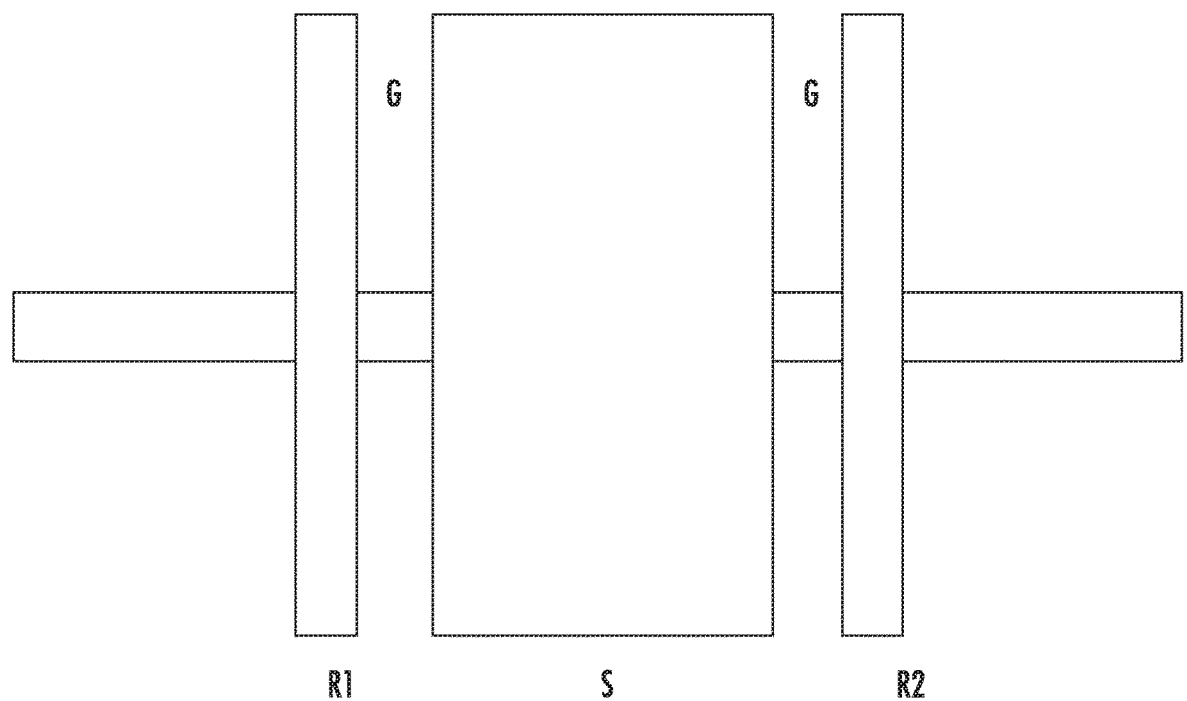
FIGS. 1a to 1c show, respectively, a general configuration of a two-rotor axial flux machine, example topologies for axial flux permanent magnet machines, and a schematic side view of a yokeless and segmented armature (YASA) machine.
Figure 1B:
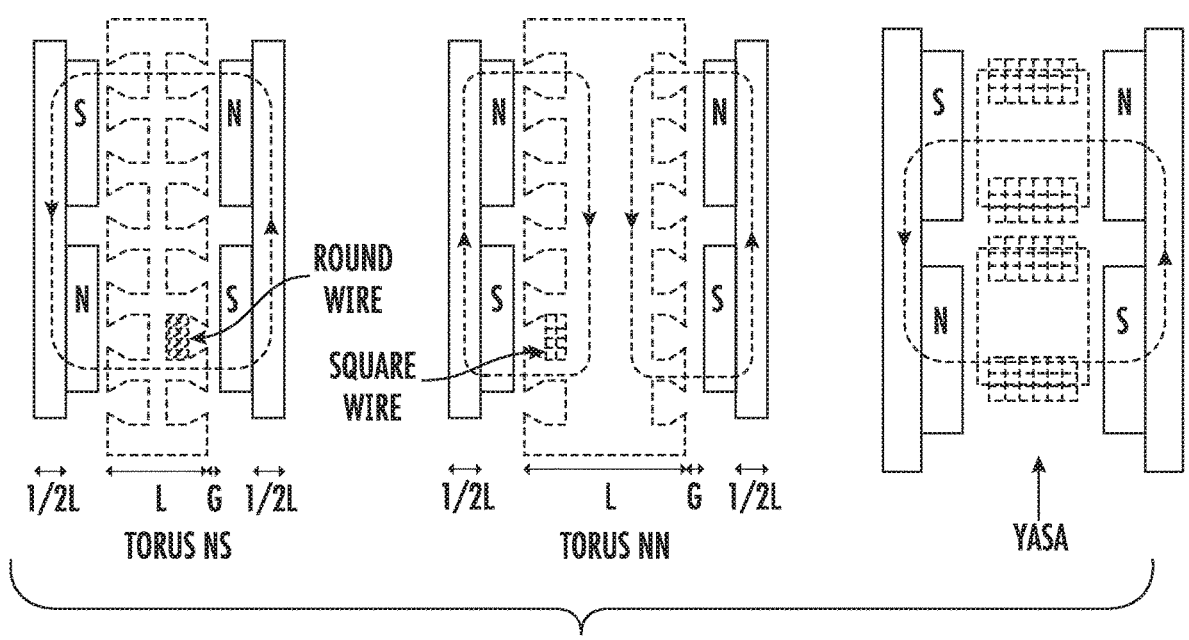
Figure 1C:
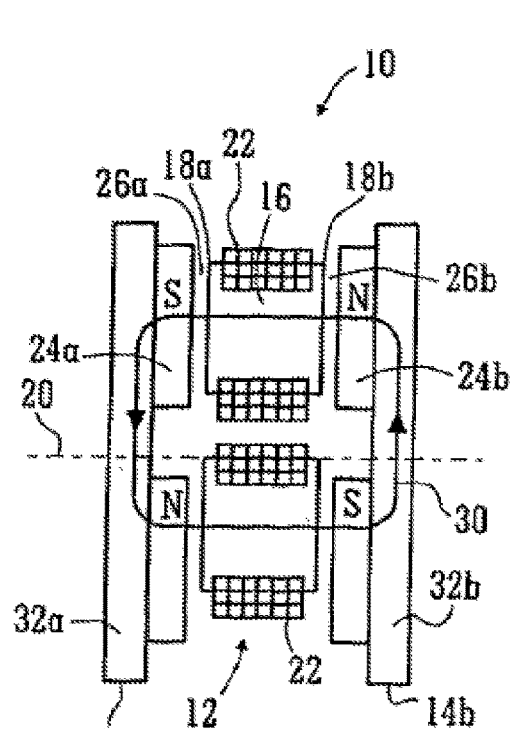
Figure 2:
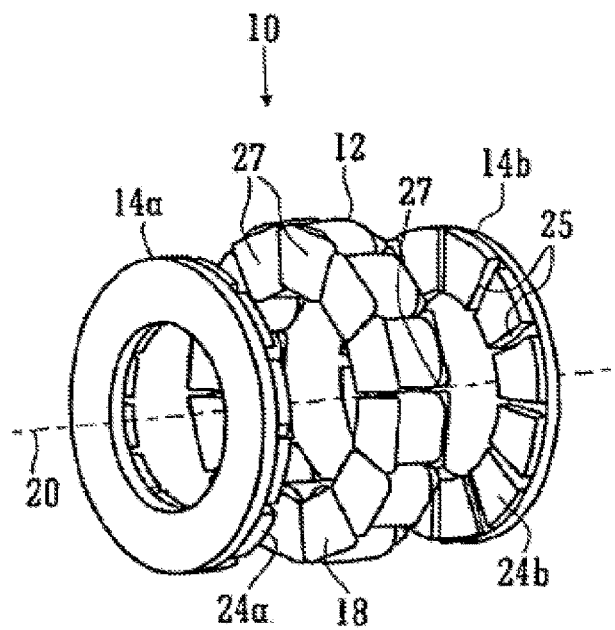
FIG. 2 shows a perspective view of the YASA machine of FIG. 1c.
Figure 3:
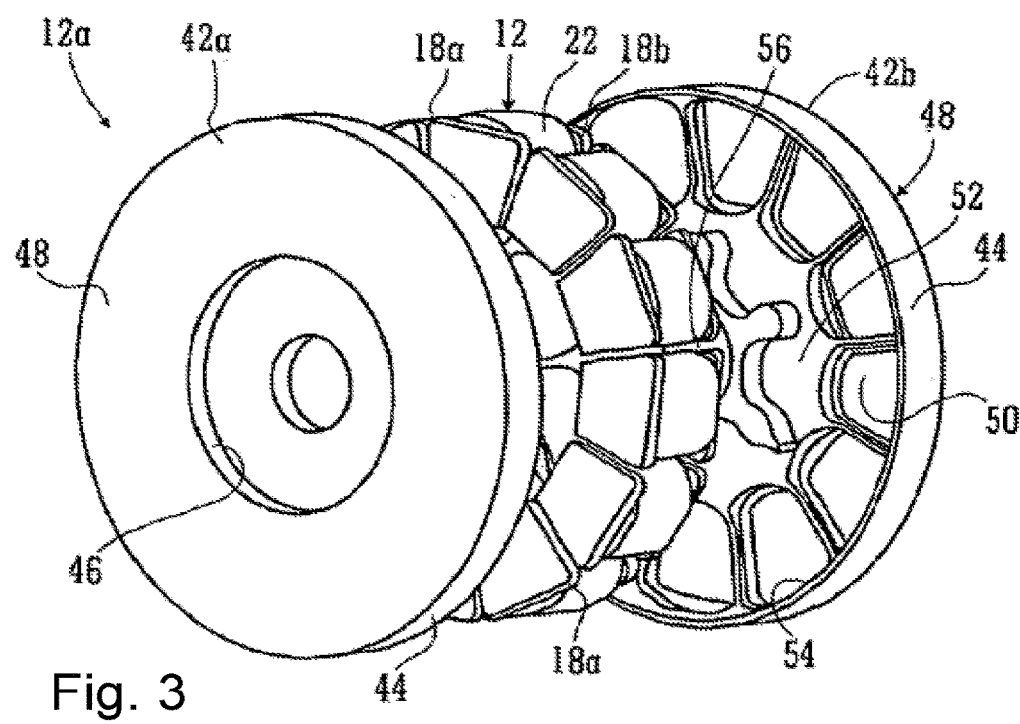
FIG. 3 shows a perspective exploded view of a stator and stator housing for a YASA machine.

Referring first to FIGS. 1c, 2 and 3, which are taken from our PCT application WO2012/022974, FIG. 1c shows a schematic illustration of a yokeless and segmented armature machine 10.

The machine 10 comprises a stator 12 and two rotors 14a,b. The stator 12 is a collection of separate stator bars 16 spaced circumferentially about a rotation axis 20 of the rotors 14a,b. Each bar 16 has its own axis (not shown) which is preferably, but not essentially, disposed parallel to the rotation axis 20. Each end of each stator bar is provided with a shoe 18a,b which serves a physical purpose of confining a coil stack 22, which stack 22 is preferably of square/rectangular section insulated wire so that a high fill factor can be achieved. The coils 22 are connected to an electrical circuit (not shown) that, in the case of a motor, energizes the coils so that the poles of the resultant magnetic fields generated by the current flowing in the coils is opposite in adjacent stator coils 22.

The two rotors 14a,b carry permanent magnets 24a, b that face one another with the stator coil 22 between (when the stator bars are inclined—not as shown—the magnets are likewise). Two air gaps 26a, b are disposed between respective shoe and magnet pairs 18a/24a, 18b/24b. In a motor the coils 22 are energized so that their polarity alternates to cause coils at different times to align with different magnet pairs, resulting in torque being applied between the rotor and the stator. The rotors 14a,b are generally connected together (for example by a shaft, not shown) and rotate together about the axis 20 relative to the stator 12. The magnetic circuit 30 is provided by two adjacent stator bars 16 and two magnet pairs 24a,b and a back iron 32a,b for each rotor links the flux between the back of each magnet 24a,b facing away from the respective coils 22. The stator coils 16 are enclosed within a housing that extends through the air gap 26a, b and which defines a chamber supplied with a cooling medium.

Turning to FIG. 3, a stator 12a is shown in which the stator coils are located between plastics material clamshells 42a, b. These clamshells have external cylindrical walls 44, internal cylindrical walls 46, and annular radially disposed walls 48. In the prior art example of FIG. 3 the radial walls 48 include internal pockets 50 to receive the shoes 18a,b of the stator bars 16 and serve to locate the stator coil assemblies 16, 22, 18a,b when the two clam shell housings 42a, b of the stator 12a are assembled together. The stator housing 42a, b defines spaces 52 internally of the coils 22 and externally at 54 around the outside of the coils 22 and there are spaces 56 between the coils. The spaces 52,54,56 are interlinked defining a cooling chamber. Although not shown in FIG. 3, when assembled, the stator housing 42a,b is provided with ports that allow cooling medium such as oil to be pumped into the spaces 52,54,56 to circulate around the coils and cool them.

In the machines we describe the coil cores may be laminated with the inter-lamination insulation parallel to the desired flux direction. However the coil cores may also be formed from soft-iron particles coated with electrical insulation and moulded to a desired shape (soft magnetic composites—SMC), being bound together by the insulation matrix. An example SMC may comprise glass-bonded iron particles, a thin layer (typically <10 μm) of glass bonding and mutually electrically insulating the iron particles, leaving some residual porosity. Conveniently the shoes and stator bar may be formed separately, for example from SMC and subsequently assembled.

Figure 4:
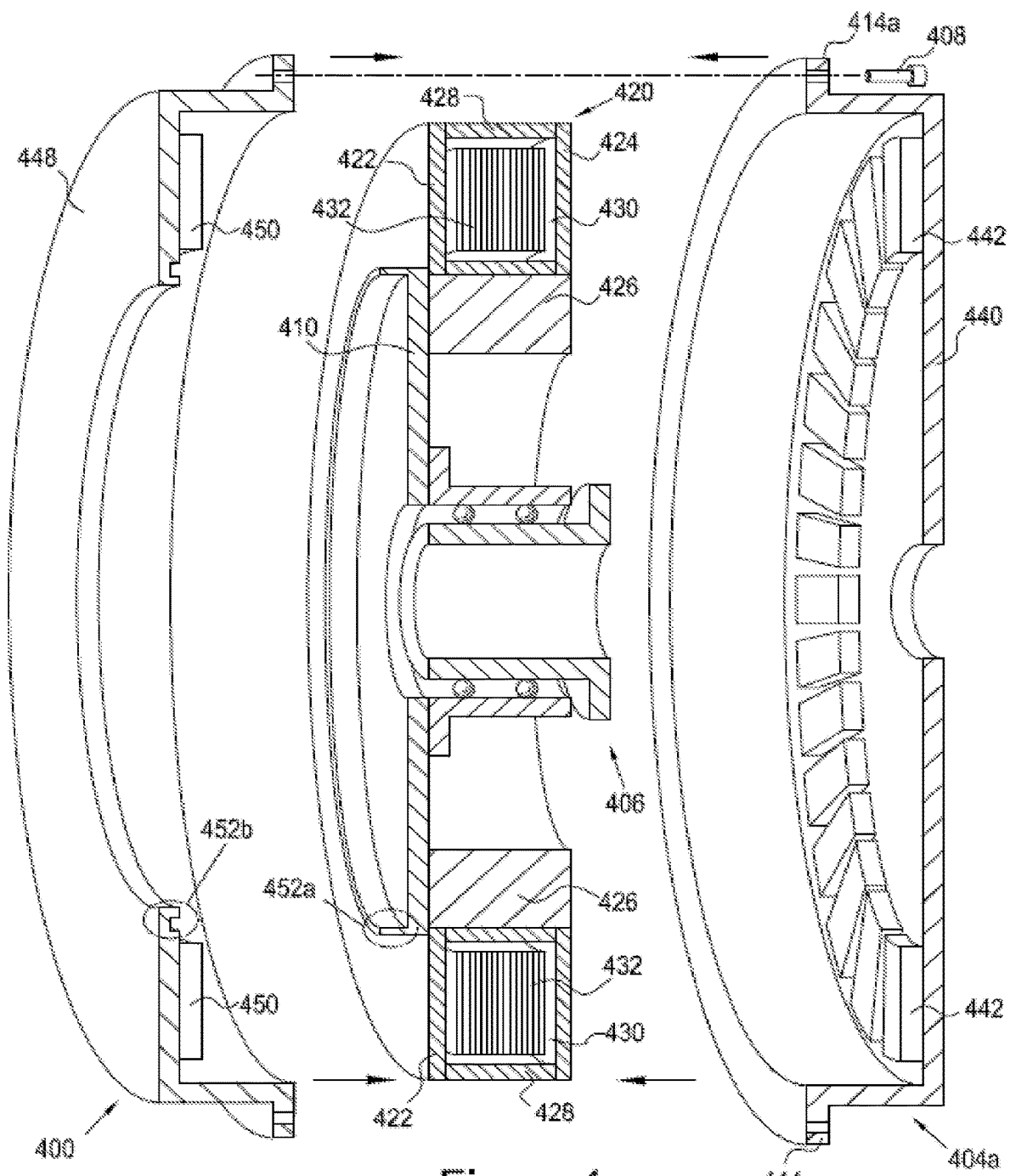
FIG. 4 shows an exploded view of a cupped rotor axial flux permanent magnet machine manufacturable using a method according to an embodiment of the invention.

Referring now to FIG. 4, this shows an exploded view of a YASA machine 400 comprising a stator 402 and a rotor 404a, b. The rotor has a cupped design, that is the stator 402 is cupped within rotor 404, which extends around the sides and over the stator. Thus although the machine is effectively a dual rotor machine only one of the rotors is mounted on a bearing unit 406 within the stator (shown simplified in FIG. 4), and the second rotor is mounted by bolts 408 to the first. The stator 402 and bearing unit 406 are mounted on a bulkhead 410, which in turn is used to mount the machine.

Rotor 404a provides a drive input/output, in the case of a generator/motor respectively (but for simplicity this is not shown in FIG. 4).

The stator 402 has a housing 420 comprising first and second radial walls 422,424 and generally cylindrical inner and outer walls 426,428, these together defining a chamber 430 within which coolant circulates. The housing encloses a set of stator coils 432; electrical connections to these are not shown for simplicity. The coils are wound around pole pieces (not shown), described further later.

The rotor 404 also has a radial wall 440 mounting a set of permanent magnets 442, and a first circumferential (side) wall portion 444 attached to a second circumferential (side) wall portion 446. The second circumferential (side) wall portion 446 supports a second radial wall 448 and a second set of permanent magnets 450. A flange 452a on the stator bulkhead fits into a corresponding groove 452b on an inner edge of a radial wall 448, to thereby define a labyrinth seal between the rotor and stator.

Referring now to FIG. 5a, this illustrates, schematically, a method of manufacturing a stator according to an embodiment of the invention. The Figure shows a cross-section through a stator assembly 500 in a plane incorporating the axis X-X' of the machine, with like elements to those of FIG. 4 illustrated by like reference numerals. Thus the radial end walls 422, 424 of the stator assembly have a gap where the hub bearing unit is located and the inner and outer cylindrical side walls 426, 428 each appear in the lower half and the upper half of the diagram. The figure also includes a schematic illustration of the stator pole pieces 432a, b mounted on each radial wall 422, 424.

The edges of the cylindrical side walls of 426, 428a are each provide with a respective projection 502, 504, in the illustrated example tapering to a sharp edge. Preferably, though not essentially, these extend completely around the circumference of the side wall edge, so that when the stator is assembled the side and end walls define a sealed substantially enclosed chamber within which coolant may be circulated.

To manufacture the stator, the pressure is applied to the end walls 422, 424, as schematically illustrated by arrows 506, and laser light is directed to the region where the projections 502, 504 contact the end walls. This is schematically illustrated by laser beams 508. The plastic of the side walls absorbs the laser beam and melts at the interface between the side and end walls, creating a weld.

Techniques for laser welding of plastic are generally known to those skilled in the art. In the illustrated approach the laser beams pass through the end walls to the side walls, and thus in this case preferably the end walls are somewhat transmissive to the (IR) laser and the end walls are somewhat absorbing of the laser. However this is not essential—for example the laser could be directed towards the joint to be welded in a radially inwards rather than in an axial direction. As illustrated, two laser beams are employed, one for each end wall weld, but it will be appreciated that, alternatively, the welds could be performed sequentially. In operation the laser beams 508 move around the circumferential edge of an end wall to complete a weld.

During the welding process the pressure 506 causes the projections 502 to collapse, as can be seen in the completed assembly 510. The rate of collapse depends, in part, upon, the pressure 506 applied, and the degree of collapse is controllable. Potentially the collapse may be controlled, more particularly stopped, by the internal pole pieces 432a,b but rather than use pole pieces with accurate heights it is more preferable to use a jig or the housing as an end stop. The pole pieces almost abut when the end walls are at the target desired spacing and parallel one another; the gap can be filled by adhesive. In embodiments approaches such as these enable the spacing of the end walls to be controlled to better than 100 micrometres. This in turn enables accurate, repeatable control of the gap between the stator and the rotors, which makes a significant contribution to the overall efficiency of the machine.

Although the approach illustrated in FIG. 5a uses a jig, or potentially an internal component(s) as an internal stop(s), in other approaches one or more features may be deliberately designed into the stator housing and/or assembly to act as a stop for controlling the collapse of the elements 502.

In these and other embodiments of the method the stator assembly may be supported in a jig prior to welding, either horizontally or vertically. Where a vertical jig is employed the end walls of the stator assembly may be clamped in place magnetically, using the pole pieces. With such an approach the jig may be provided with one or more stops to control the spacing of the end walls during the weld, again so that a target desired spacing is achieved.

In a still further approach, in particular where a jig is employed, the spacing between the radial end walls may be measured at one or more positions, for example by a laser or a linear transducer and the welding, in particular the pressure, may be controlled until a target spacing/degree of parallelism of the walls is achieved within a desired tolerance. Thus the skilled person will appreciate that it is not essential to use one or more stops in the manufacturing process.

In embodiments a side wall may be made of a single plastic (polymer) material but, as described further below, an end wall preferably comprises two (or more) different plastics. Thus some preferred end wall embodiments comprise a thin wall of relatively low melting point material bonded (by injection moulding) to a supporting framework or "spider"

of higher melting point material, such as a phthalamide-based material. In this case the side walls 426, 428 are preferably bonded to the supporting framework rather than to the end wall per se. Preferably, but not essentially, the stator pole pieces 432*a*, *b* are bonded to the radial end walls prior to fabrication (welding) of the housing as this facilitates alignment of the internal components. In embodiments the pole pieces 432*a*, *b*, which are attached to the respective end walls, may be bonded to one another for increased overall strength and rigidity of the structure.

In some preferred embodiments of the manufacturing method a collapsible element (projection 502), and a portion of the end wall to which it is to be welded, are made of the same material, preferable a phthalamide-based material because this is very stiff. However it is not essential for the laser welded bond to employ the same type of plastic for both workpieces, provided that the plastics employed are compatible with laser welding. The establishment of suitable welding parameters is a matter of routine. Typically an IR wavelength of longer than 800 nm is employed, and preferably a solid state laser is used; the beam may be continuous or pulsed.

In general plastics are relatively transmissive to infrared; to make a plastic material absorbent it may be doped, for example with carbon black, for example at around 0.5% w/w. Experiments have demonstrated that where the laser passes through the end wall supporting framework (spider) at least around 30% transmission can be achieved: Whilst the framework heats slightly it does not melt except where heat is transferred from the side wall, and at this point both surfaces melt and intermingle to form a good bond.

Although the materials used are described as "plastic" they are not generally pure plastic. In some preferred embodiments they are glass filled to at least 25%, typically around 35%, with short glass fibres. Additionally or alternatively carbon fibres may be employed. It is also possible to use laser welding to join (glass/carbon fibre reinforced) plastic to metal such as stainless steel, and thus embodiments of the technique are not limited to use with plastic end/side walls.

FIG. 5*a* shows a preferred approach, in which laser welding is employed to controllably collapse a joint between an end wall and the side walls of the stator housing. However embodiments of the technique may also be employed to join metal to metal, for example using an adhesive bead as a collapsible element. In this way both the side and end walls may both be fabricated from, for example, aluminium or steel.

FIG. 5*b* shows an alternative approach in which a square-ended projection 520 is used instead of the pointed projections 502, 504 of FIG. 5*a*. This example also illustrates an approach in which a projection is provided on only one edge of the side walls, rather that both edges of the side walls. It is, nonetheless preferably to provide a collapsible feature along both edges of the cylindrical side walls as this provides a better joint, and greater tolerance to initial variations in the assembly dimensions which can afterwards be compensated for by controlled collapse of the assembly.

Figure 5C:
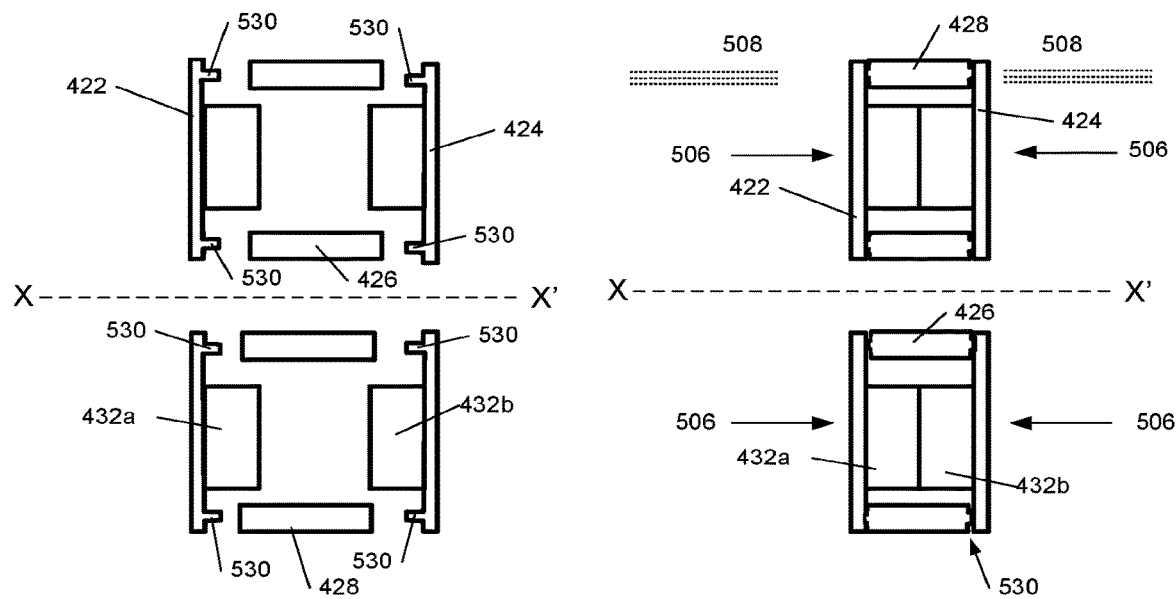

FIG. 5*c* illustrates a further variant in which the collapsible features 530 are provided on the radial end walls rather than on the side walls.

Figure 5D:
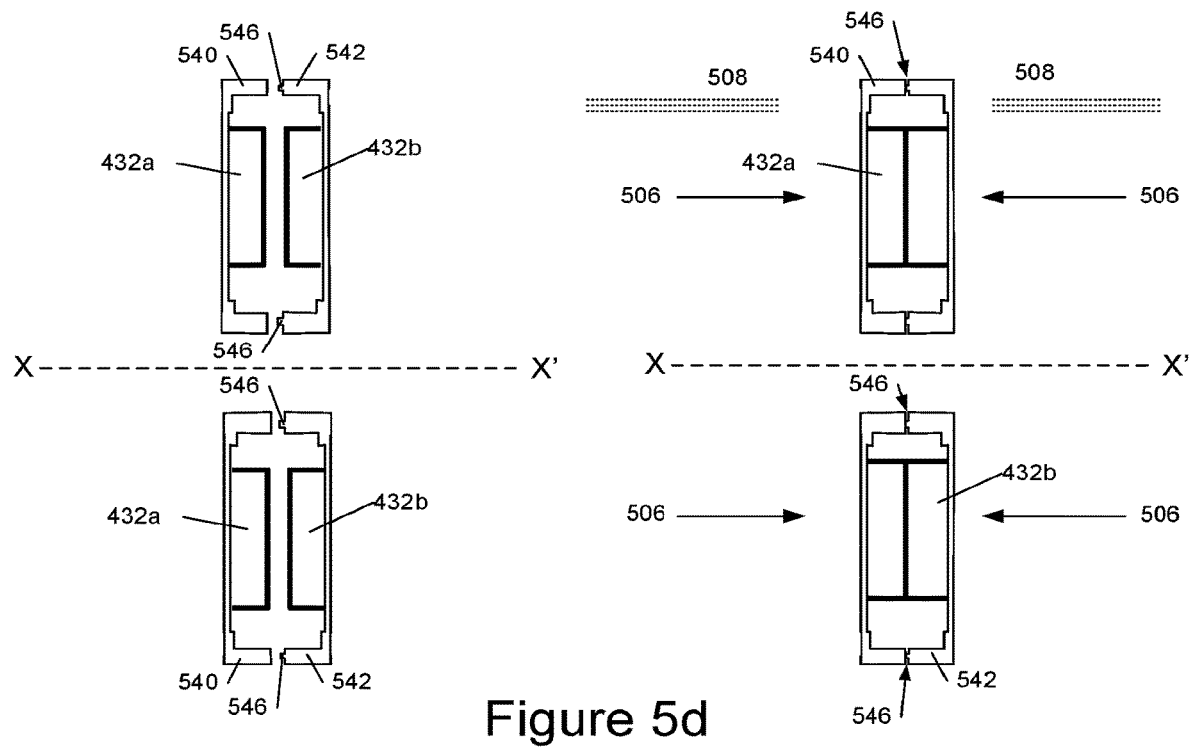

FIG. 5*d* illustrates a still further variation in which, prior to fabrication, the housing comprises a pair of clamshells 540, 542, each comprising a radial end wall and part of the inner and outer side walls of the housing. One of the clamshells is provided with one or more collapsible features 546 as previously described.

Figure 6A:
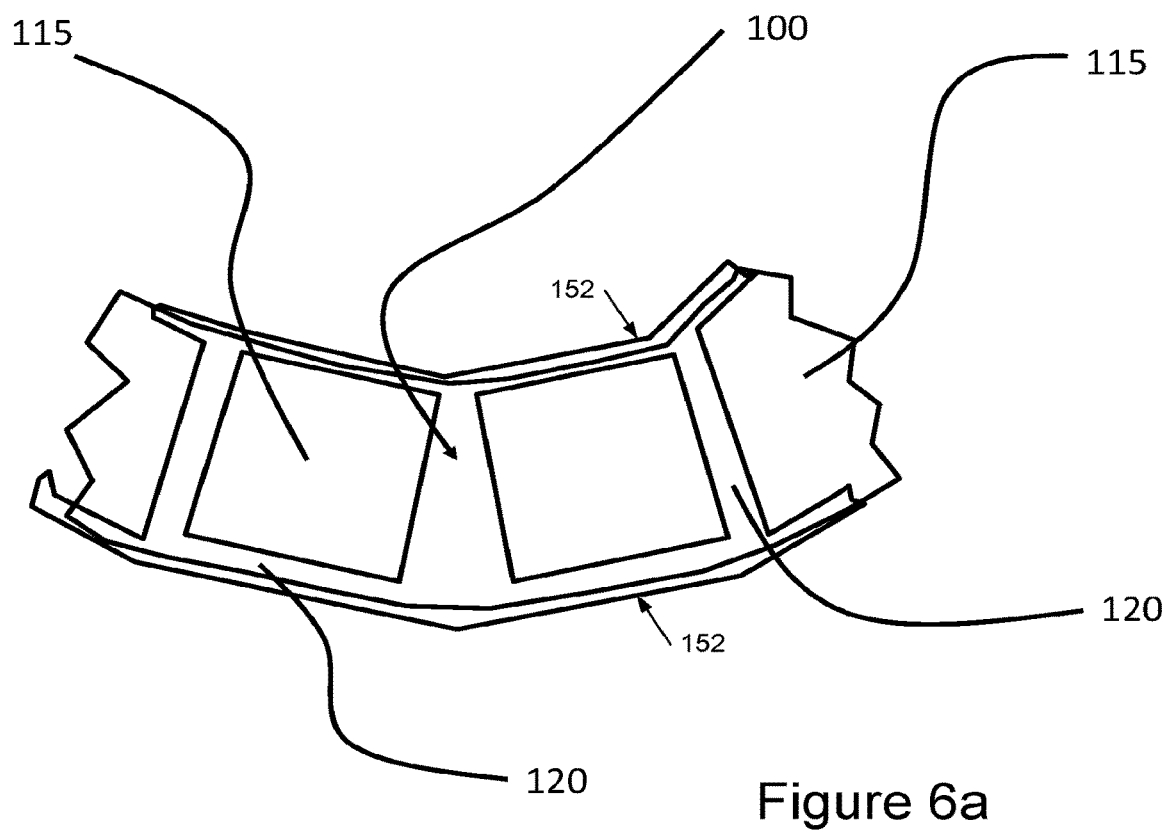
FIGS. 6a and 6b show, respectively, a view from above, and a vertical cross-section, of an annular radial wall of a stator housing according to an embodiment of the invention.

Referring to now to FIG. 6*a*, this shows, schematically, a view from above of a radial wall 100 of a stator housing, also illustrating cylindrical walls 152 of the housing. The radial wall comprises a thin, reinforced membrane of thermoplastic material onto which has been moulded a set of radial and circumferential reinforcing ribs 120, leaving cavities 115 there between to accept shoes of the pole pieces.

Figure 6B:
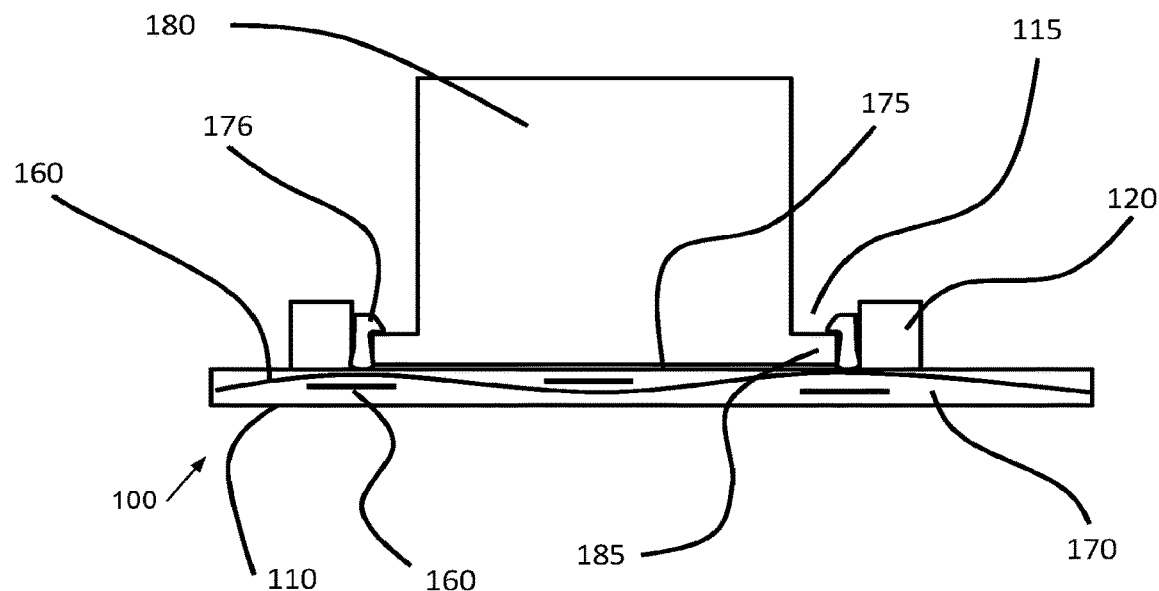

FIG. 6*b* illustrates a cross section through the wall, which comprises a membrane of fibre-reinforced thermoplastic material comprising (plain weave) reinforcing fibre 160 impregnated with a thermoplastic resin 170, preferably an "engineering polymer" which is relatively strong at high temperature such as PPA or PEEK or, in embodiments PA6 and/or PA66. A process for forming radial wall 100 comprises inserting the membrane into a mould tool and shutting off the tool so as to form radial and circumferential ribs, preferably at least 3 mm thick. These may be formed using a thermoplastic polymer compatible with that of the thin thermoplastic membrane, the ribs being intimately bonded to the membrane during the injection moulding process. The tool may be briefly unclamped and re-clamped during the moulding, allowing the membrane to expand, for a flatter surface.

To attach the stator pole piece 180 it is heated and pressed into the thin membrane 110, the reinforcement (glass fibre) acting as a stop. In a production process the pole pieces/shoes may initially be bonded to the membrane, using a template to hold them in place, heating the SMC by induction. In a preferred approach, rather than split a stator bar in the middle, one part of a stator bar comprises the pole piece and the shoe and the other part a shoe for the other end which abuts the pole piece when the motor is assembled, after a coil has been positioned over the pole piece. The overall box structure which results is very strong when assembled, in part because there is a very large surface area bonding the shoes to the membrane.

The relatively small quantity of thermoplastic polymer 170 in the thin membrane 110 is sufficient to form an exceptionally strong bond to SMC pole pieces. However the bonding can remove resin from the membrane leaving the fibres apparent. Optionally, therefore, a supplementary thermoplastic polymer membrane 175 may be included. This supplementary membrane 175 may have a thickness of order ~0.25 mm, and provides space filling for any unevenness of substrates 180 and 110 and flashing 176 when pole piece 180 is heated and pressed into thin membranes 175 and 110. This flashing helps to augment bonding of the pole shoes and also fills tolerance gaps between ribs 120 and pole shoes 185.

This technique facilitates accurate control of the thickness of membrane between the end (shoe) of a stator bar and the air gap. In addition the resulting structure has a very thin radial wall, oil integrity, the useful function of holding the pole pieces in their correct relative positions during assembly and, when the structure is fully assembled, provides great strength. As previously described in our WO2012/022974, where a clamshell-type approach is employed the stator bars/pole pieces may be split at some point along their length so that one shoe/stator bar can be attached to each clamshell prior to joining the clamshells and stator bars. Alternatively the stator bars may be assembled onto one clamshell and then the second joined to the first and bonded to the stator bars at the same time, avoiding the need to split the stator bars for a stronger structure.

Optionally a reinforcing feature or rib may be fabricated from a plurality of lamina, compressed and heated together to mutually bond. Preferably each lamina is fibre reinforced so that the weave extends through substantially the entire radial wall, that is both through the membrane and its reinforcement. Optionally the direction(s) of weave may differ from one lamina to the next.

In one exemplary approach, therefore, a method of manufacturing an axial machine stator housing according to an embodiment of the invention comprises forming the radial wall of the stator housing by injection moulding a framework or spider together with a reinforced membrane. This (very thin) membrane will form those parts of the wall which are adjacent to the pole pieces. The method may then comprise bonding the pole pieces (with or without shoes) to the membrane, preferably using a combination of heat and pressure. The method may also involve forming inner and outer walls for the stator housing, incorporating into these an IR-absorbing material such as carbon black. The method then comprises assembling the side and end walls in to a stator housing assembly, preferably with adhesive on the mating faces of the pole/shoe pieces; and attaching, preferably welding, the side and end walls of the housing together. Force is applied, preferably during the attaching/welding, to control the axial compression of one or more collapsible elements of the stator housing, to thereby control the spacing (and parallelism) of the outer walls of the stator, preferably to within a predetermined manufacturing tolerance. The machine may then be completed by assembling the rotor(s) to lie adjacent to the stator. The very precise and repeatable axial length of the stator facilitates the fabrication of a machine where one rotor is mounted on the other in a "cupped rotor" configuration. The manufacturing methods we described also facilitate the use of a labyrinth seal between the stator and a/the rotor, which would otherwise be difficult to achieve.

Figure 7:
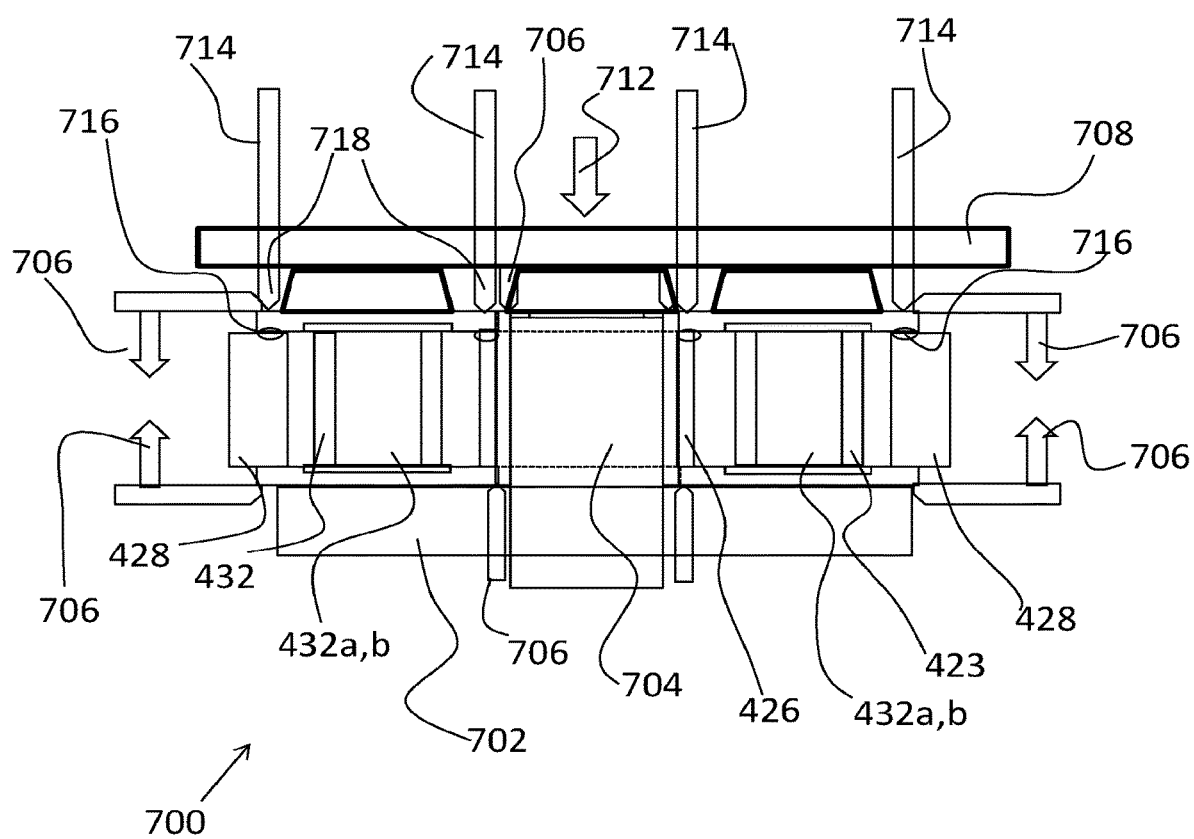
FIG. 7 shows a schematic illustration of a jig for use in embodiments of the invention.

Turning now to FIG. 7, this shows a schematic illustration of a jig 700 which may be employed in such a manufacturing technique. The jig comprises a support 702 for supporting a stator end wall and an axial projection 704 to act as an alignment tool for axially aligning the stator end walls. The projection 704 also carries the inner side wall; the outer end wall may be aligned to the side walls, for example using one or more datum features. In embodiments one or both faces (edges) of the inner and outer side walls define a reference surface which is used for measuring a distance to an end wall or the spacing between the end walls.

Prior to welding the lower stator plate assembly (lower wall) includes the stator bars, motor windings, and stator bar shoes at one end (at the other end these are bonded to the upper stator plate/wall). The end walls of the assembly are clamped to hold the assembly together, as schematically illustrated by arrows 706. Since, in embodiments, the stator bars have a relatively large length tolerance, preferably these are slightly under-length and adhesive is applied to the ends of the bars to fill the gap between the bar ends and the shoes to which they will finally be attached. Preferably relatively thick adhesive is used, so that it doesn't run; the adhesively may be of an inductively-cured type.

Preferably the stator end walls ("plates") each have a rib running around their inner and outer circumferential edges, to provide stiffness. This may be relatively low, for example ~0.3 mm. A stator wall may be flat to within a flatness tolerance of, say, 0.2 mm. Thus when setting the position of a stator wall in the jig an additional 0.5 mm may be allowed. More generally, when a jig is used to control the position of a stator wall or spacing between the walls, preferably sufficient tolerance is allowed to compensate for the flatness variation or flatness tolerance of a stator end wall. In this way, even though there may be some misalignment or lack of flatness within the structure, the side walls can nonetheless be aligned substantially parallel to one another.

As shown in FIG. 7, embodiments of the jig may comprise an IR transparent top plate 708 and a mechanical connection 710 between this and the upper stator wall/plate. In this way a clamping force, as indicated by arrow 712, may be applied to the assembly. This facilitates force control until sufficient contact has been achieved between the end wall(s) and side walls, and subsequent distance control (preferably with force monitoring), to set the spacing between the stator walls.

In embodiments of the technique the inner and outer side walls 426, 428 are welded at the same time in a high-speed, multiple-pass, quasi-simultaneous weld, indicated by laser beams 714 making welds 716 at locations indicated by arrows 718. In one exemplary approach the upper stator wall/plate is welded and then the structure is flipped over whilst clamped to weld the lower stator wall/plate bearing the stator bars and coils. The same weld control process, described above, may be used for both upper and lower plates.

No doubt many other effective alternatives will occur to the skilled person. It will be understood that the invention is not limited to the described embodiments and encompasses modifications apparent to those skilled in the art lying within the scope of the claims appended hereto.

The invention claimed is:

1. A method of manufacturing a stator of an axial flux permanent magnet machine, the machine having a stator comprising a stator housing defining a chamber comprising a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap therebetween in which magnetic flux in the machine is generally in an axial direction, the method comprising:
    providing first and second radial walls for said stator housing;
    providing inner and outer side walls for said stator housing;
    assembling said first and second radial walls and said inner and outer side walls around said set of coils to form a stator assembly, wherein said assembling further comprises:
    providing one or more collapsible elements between said side walls and one or both of said first and second radial walls; and
    attaching said side walls to said first and second radial walls, wherein said attaching comprises
    controlling one or both of a spacing and a degree of parallelism of said first and second radial walls by controlling the collapse of said one or more collapsible elements.

2. A method as claimed in claim 1, wherein one or both of said radial walls and said side walls comprise a polymer, and wherein a said collapsible element comprises a polymer formation on a said radial wall and/or on a said side wall.

3. A method as claimed in claim 2 wherein said attaching comprises laser welding said radial walls to said side walls.

4. A method as claimed in claim 1, wherein one or both of said radial walls and said side walls comprise a thermoplastic polymer, a high temperature thermoplastic polymer, or a PPA.

5. A method as claimed in claim 1 wherein a said collapsible element comprises adhesive, and wherein one or both of said radial walls and said side walls are made from metal.

6. A method as claimed in claim 1 wherein said controlling of said collapse comprises collapsing said one or more controllable elements until stopped by one or more stops.

7. A method as claimed in claim 6 further comprising using one or more internal components of said stator assembly as said one or more stops.

8. A method as claimed in claim 1 wherein said controlling of said collapse comprises mounting said stator assembly on a jig and controlling said collapse using said jig.

9. A method as claimed in claim 1 wherein said controlling further comprises measuring said spacing and/or degree of parallelism of said first and second radial walls.

10. A method as claimed in claim 1 further comprising fabricating said first and second radial walls by placing a resin membrane into a mould of an injection moulding machine, and injection moulding a set of reinforcing features onto said membrane using a thermoplastic polymer bondable when molten with the resin of said membrane.

11. A method as claimed in claim 1 further comprising fabricating said first and second radial walls by: providing a membrane of polymer material; pressing at least ends or shoes of said set of said stator bars into said membrane of polymer whilst said polymer is mouldable, wherein at least a said end or shoe of a said stator bar is formed from a porous magnetic material; and solidifying said polymer to hold said ends or shoes of said set of stator bars in their respective positions; wherein said polymer of said membrane bonds with said porous magnetic material during said pressing to bond said set of stator bars to said polymer.

12. A method of manufacturing a stator of an axial flux permanent magnet machine, the machine having a stator comprising a stator housing defining a chamber comprising a set of coils wound on respective stator bars and disposed circumferentially at intervals about an axis of the machine, and a rotor bearing a set of permanent magnets and mounted for rotation about said axis, and wherein said rotor and stator are spaced apart along said axis to define a gap therebetween in which magnetic flux in the machine is generally in an axial direction, the method comprising:
providing first and second stator housing clamshells, each comprising a radial wall for the stator housing and at least a portion of a side wall for the stator housing;
assembling said first and second stator housing clamshells around said set of coils to form a stator assembly, wherein the first and second stator housing clamshells together define an annular chamber enclosing said set of coils, and wherein said assembling further comprises:
providing one or more collapsible elements between said first and second stator housing clamshells; and
attaching said first and second stator housing clamshells, wherein said attaching comprises:
controlling one or both of a spacing and a degree of parallelism of said first and second radial walls by controlling the collapse of said one or more collapsible elements.

13. A method as claimed in claim 12 wherein one or both of said stator housing clamshells comprise a polymer, and wherein a said collapsible element comprises a formation on either or both of said stator housing clamshells.

14. A method as claimed in claim 13 wherein said attaching comprises laser welding said stator housing clamshells to one another.

15. A method as claimed in claim 12 wherein one or both of said stator housing clamshells comprise a thermoplastic polymer, a high temperature thermoplastic polymer, or a PPA.

16. A method as claimed in claim 12 wherein a said collapsible element comprises adhesive, wherein one or both of said stator housing clamshells are made from metal.

17. A method of manufacturing an axial flux permanent magnet machine comprising manufacturing a stator as recited in claim 1 and then fabricating said axial flux permanent magnet machine using said stator.

18. A method as claimed in claim 17 comprising fabricating said axial flux permanent magnet machine with two said rotors, one to either side of said stator, the method further comprising mounting one said rotor on the other said rotor.

19. A method as claimed in claim 17 wherein said axial flux permanent magnet machine is a yokeless and segmented armature machine.

20. A method of manufacturing a stator for an axial flux permanent magnet machine, the stator including a stator housing defining a chamber having a set of coils wound on respective stator bars and disposed circumferentially at intervals about an axis of the machine, and wherein the machine includes a rotor bearing a set of permanent magnets and mounted for rotation about said axis, and wherein said rotor and stator are spaced apart along said axis to define a gap therebetween in which magnetic flux in the machine is generally in an axial direction, the method of manufacturing the stator comprising:
controlling the axial compression of one or more collapsible elements of said stator housing during fabrication of the housing, using laser welding, to control a spacing between end walls of said housing.

21. A method of manufacturing an axial flux permanent magnet machine comprising:
manufacturing said stator as recited in claim 20; and
fabricating said axial flux permanent magnet machine using said stator.

* * * * *